United States Patent [19]
Harris et al.

[11] 4,280,330
[45] Jul. 28, 1981

[54] VEHICLE HEATING AND COOLING SYSTEM

[75] Inventors: Verdell Harris, 455 Carlton Ave., Brooklyn, N.Y. 11238; Richard L. Miller, Dix Hills, N.Y.

[73] Assignee: Verdell Harris, Brooklyn, N.Y.

[21] Appl. No.: 59,971

[22] Filed: Jul. 23, 1979

Related U.S. Application Data

[63] Continuation-in-part of Ser. No. 834,677, Sep. 19, 1977, abandoned.

[51] Int. Cl.³ .................. F25B 21/02; B60H 3/04
[52] U.S. Cl. .................................. 62/3; 62/231; 62/236; 62/244; 237/12.3 C; 123/198 R; 123/179 R
[58] Field of Search ............... 62/3, 244, 236, 231; 237/12.3 C; 123/198 R, 179 R

[56] References Cited

U.S. PATENT DOCUMENTS

| | | | |
|---|---|---|---|
| 2,201,765 | 5/1940 | Euwer | 165/42 X |
| 2,962,873 | 12/1960 | Anderson | 62/236 X |
| 3,138,934 | 6/1964 | Roane | 62/244 X |
| 3,475,919 | 11/1969 | Ellis | 62/236 X |
| 3,877,639 | 4/1975 | Wilson et al. | 237/12.3 C |

*Primary Examiner*—Albert W. Davis
*Attorney, Agent, or Firm*—Richard L. Miller

[57] ABSTRACT

An air conditioning system primarily intended to be installed in an automative vehicle for selectively heating or cooling the passenger compartment for comfort as might be desired by the occupants.

The system is completely battery operated and may be programmed to cool or heat the compartment without the engine of the vehicle operating. In addition since the system contains its own battery electrical emergency power may be transferred to the vehicle starting system should condition necessitate such.

4 Claims, 4 Drawing Figures

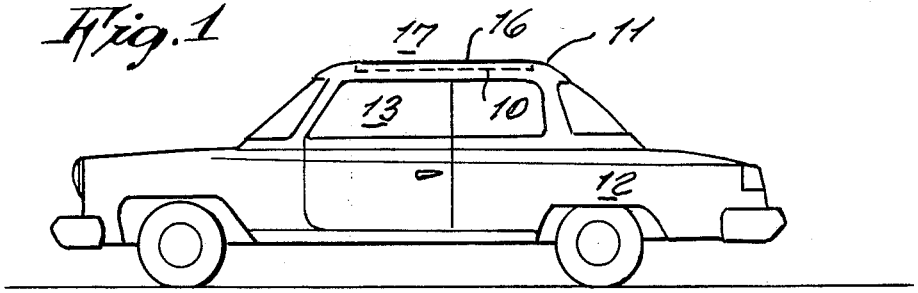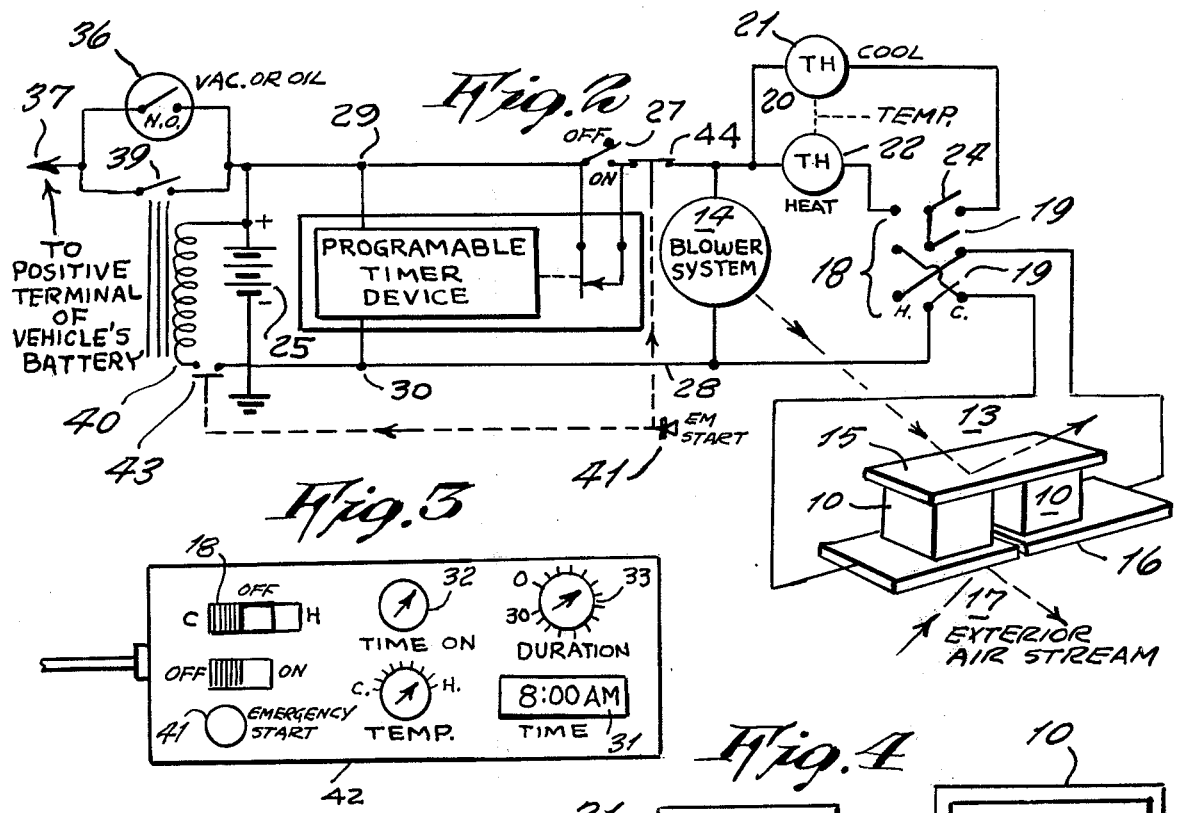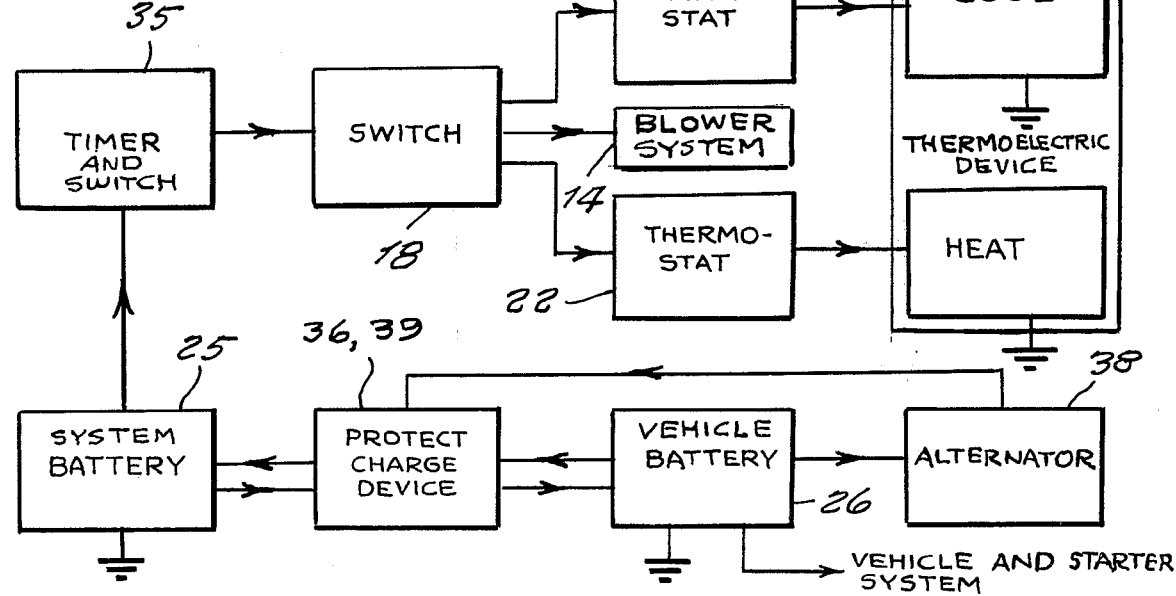

VEHICLE HEATING AND COOLING SYSTEM

This application is a continuation-in-part of parent application filed by applicant Verdell Harris Ser. No. 834,677 filed on Sept. 19, 1977 now abandoned which is now being joined by coinventor Richard L. Miller.

BACKGROUND OF THE INVENTION

This invention relates generally to heating and cooling systems of the air in the passenger compartment of automative vehicles.

Heretofore heating and cooling systems for automobile interiors have been designed which require the engine of the vehicle to be operating simultaneously while the heating or cooling system is operated. In addition to being inefficient and wasteful of fuel this situation makes it difficult to have a programable system which can either heat or cool the passenger compartment to a comfortable temperature before the passengers enter the compartment.

SUMMARY OF THE INVENTION

Therefore it is the principle object of the present invention to provide a vehicle heating and cooling system which respectively does not require the heat from the engine as a heat source or a rotating shaft to operate a refrigerant compressor as is the case of conventional vehicle heating and cooling systems.

Another object is to provide a vehicle heating and cooling device which may be programmed to turn on at a specific time in advance of the passenger entering the vehicle without the engine of the vehicle being started.

Yet another object is to provide a system which has its own separate battery so that during conditions such as extremely cold weather when it might be difficult to turn over and start the vehicle's engine emergency power can be transferred to the vehicle's electrical starting system from the heating and cooling system's battery if required.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view of an automobile showing a thermoelectric cooler in dotted lines mounted in the roof compartment of the vehicle.

FIG. 2 is an electrical schematic diagram of the vehicle heating and cooling system.

FIG. 3 is a typical control panel for operating the system.

FIG. 4 is a block diagram illustrating the system connected with the vehicle's electrical starting system.

DETAILED DESCRIPTION OF PREFERRED EMBODIMENT

Throughout this disclosure like numerals will be used to represent the same elements even though they appear in different figures.

Referring now to the drawings in greater detail, the reference numeral 10 represents a thermoelectric cooler element mounted within the roof compartment 11 of an automative vehicle 12. The thermoelectric device utilizes the Peltier phenomenon to provide a silent, heat pump which has no moving parts to transfer heat into or out of the passenger compartment 13 depending on the polarity of the current supplied to its electrical input terminals.

A blower system 14 is concealed within the interior of the vehicle with a proper ducting network as would be required but not shown in order that interior passenger compartment air 13 be efficiently circulated from the passenger compartment to an interior heat sink surface 15 of the thermoelectric device 10 and back again to the passenger compartment.

The thermoelectric device is mounted in the roof compartment of the vehicle with its exterior heat sink surface 16 placed in such a way that there will be a large heat transfer coefficient between the exterior heat sink surface and air 17 exterior to the vehicle.

A triple pole double throw switch with center position off generally shown at 18 in FIG. 2 is used to direct the flow of current through the thermoelectric device 10. When the blades 19 of the switch which are ganged together are in contact with their respective group of contacts labeled H current is directed through the thermoelectric element so that interior heat sink surface 15 will rise in temperature while exterior heat sink surface 16 will be lowered as would be required in order to heat the passenger compartment of the vehicle. Conversely when the switch blades are in contact with the group of contacts labeled C the current is directed through the thermoelectric device in the opposite direction as would be required in order to cool the passenger compartment of the vehicle.

A thermostatic system shown generally at 20 consists of two thermostats 21 and 22 both of which would have their heat sensitive element located in the passenger compartment of the vehicle. One control knob 23 would be used to set the desired passenger compartment temperature in the vehicle for both thermostats which are mechanically ganged together. Thermostat 21 control the current to the thermoelectric device responsive to some function of the difference between the temperature of the passenger compartment air 13 and the temperature set on control knob 23 when the air is being cooled and conversely thermostat 22 does the controlling in the same manner when the air is being heated.

An additional blade 24 contained in switch 18 automatically selects which thermostatic is operative depending on whether the switch is set in position H for heating or position C for cooling as is obvious from the schematic diagram of FIG. 2.

The vehicle heating and cooling system thus so far described is completely self operative to the extent that the only source of external inputs required are direct current electrical energy, and exterior air in which to pump to or from the required heat. Thus this system may be turned on by a number of simple means heretofore not very simply accomplished because there is no neccessity for the engine of the vehicle to be running.

The vehicle heating and cooling system contains its own battery 25 separate and apart from but compatable with the battery 26 of the vehicle electrical starting system.

There are three methods in which the heating and cooling system may be turned on. In the first method a switch 27 located on the dashboard may be placed in its on position by the driver of the vehicle. Referring now to FIG. 2 it will be seen that when switch 27 is closed electrical current will flow out of the positive terminal of battery 25 through switch 27 through blower 14 and back through the system's ground conductor 28 to the negative terminal of battery 25 thereby completing the blower circuit necessary to circulate air in the passenger compartment of the vehicle. In addition current will also flow through thermostat 21 or 22 depending on which contacts the blades 19 and 24 of switch 18 are in contact with, and then through thermoelectric device 10 to the system's ground conductor 28 and back to the negative terminal of battery 25. Thus the thermoelectric device will either pump heat into or out of the vehicle at the rate required to maintain the air temperature of the passenger compartment as set on indicator knob 23.

The second method whereby the system may be activated is by a programable timer device 28 also located on the dashboard of the vehicle. A programable timer device 28 has its input terminals 29 and 30 connected across the terminals of battery 25 so that it constantly maintains a time reference and displays such time on a clock face 31 in view of the vehicle's operator. Two control knobs 32 and 33 allow the operator to set the desired turn on time and duration of the vehicle heating and cooling system respectively. At the programed time contacts 34 close for the programed duration of time as set by knob 33. Since contacts 34 are in parallel with contacts 27 the system operates automatically identically as previously described.

It is now obvious that a third method of activating the system is by any device which has its contact closure wired in parallel with contacts 27 and 34 such as the contacts of a radio controlled receiver system (not shown) operated by a remote transmitter and briefly this function would be depicted by block 35 in FIG. 4.

The battery 25 of the heating and cooling system requires an electrical source that can charge it from time to time in order that it be maintained with sufficient energy level to properly operate the system. An engine manifold vacuum operated or engine oil pressure operated switch 36 which is normally an open circuit when the engine of the vehicle is not running, the contacts of which close after the engine is running is connected between the positive terminal of battery 25 of the system, and the positive terminal of the vehicle's starting system battery 26 as best illustrated by arrowhead 37 in FIG. 2.

When the heating and cooling system is operating with the vehicle's engine not running all electrical energy is drawn out of system's battery 25, because switch 36 is an open circuit. When the vehicle's engine is started and only after sufficient engine manifold vacuum or engine oil pressure is reached then switch 36 contacts close to permit the vehicle's alternator 38 to charge battery 25 and or supply additional power as may be required by the heating and cooling system.

In parallel with switch 36 are the normally open contacts 39 of relay 40. Contacts 39 are closed by the command of the operator of the vehicle during emergency conditions when for one reason or another the vehicle's battery does not have sufficient charge to start the engine but the heating and cooling system's battery does have sufficient charge. This situation might readily occur for example from any one of the following: (1) during extremely cold weather, (2) the vehicle was left parked with head lights on by accident or (3) a small short circuit in the vehicle wiring, etc.

In order to operate relay 40 a momentary push button switch 41 located on the heating and cooling system's control panel 42 or other convenient location in the vehicle is held depressed by the operator of the vehicle while starting the engine in an otherwise normal manner. Holding depressed the emergency starting button 41 closes normally open switch 43 which causes relay 40 to close contacts 39 only if sufficient voltage is present at battery 25 as will best be seen in the schematic diagram of FIG. 2. If the battery 25 does not have sufficient charge, relay 40 is designed not to operate, thus preventing accidental reverse discharging of the vehicle's battery into the heating and cooling system. In addition a separate normally closed switch 44 is operated by depressing emergency starting button 41 which interrupts the flow of current to the blower 14 and the thermoelectric device so that electrical energy will not be wasted during emergency starting conditions on heating or cooling the vehicle passenger compartment.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A vehicle heating and cooling system for use with an automotive vehicle having a first battery and an alternator for charging the battery, comprising: a thermo-electric heat pump; a second battery electrically connected to said heat pump for operating said heat pump; switch means for controlling the flow of current to said heat pump from said second battery, said switch means controlling the mode of operation of said heat pump so that said system acts in a first mode of heating the compartment of an automotive vehicle and in a second mode of cooling the compartment; means for controlling the temperature of the air in said compartment, said means for controlling the temperature comprising a first thermostat operative when said system is in said first mode of operation, and a second thermostat electrically parallel with said first thermostat and operative when said system is in said second mode of operation; a fan for distributing the air in said compartment, said fan being connected in parallel with said second battery for operation thereby; first means for connecting the positive terminal of said second battery to the positive terminal of said first battery of said automotive vehicle, said first means for connecting comprising a first switch which is in the normally open position when the engine of the automotive vehicle is not running, and in a closed position when the engine of the automotive vehicle is running, so that said second battery may be periodically charged by the alternator of the automotive vehicle; and second means for connecting the positive terminal of said second battery to the positive terminal of said first battery, said second connecting means comprising a second switch, said second switch being normally open, and a relay connected in parallel with said second battery for closing said second switch when activated, whereby said second battery may be used in order to start the engine of the automotive vehicle when the first battery is low or inoperative.

2. The vehicle heating and cooling system according to claim 1, wherein said first switch of said first connecting means is operative in response to the oil pressure in the engine of the automotive vehicle.

3. The vehicle heating and cooling system according to claim 1, wherein said first switch of said first connecting means is operative from the engine manifold of the automotive vehicle.

4. The vehicle heating and cooling system according to claim 1, wherein said second connecting means further comprises means for disconnecting the current from said second battery to said fan when said relay is activated so that decreased power drain of said second battery will result.

* * * * *